United States Patent Office 3,249,654
Patented May 3, 1966

3,249,654
POLYMERIZATION OF A VINYL ESTER WITH A POLYMERIC ACETAL
Wulf von Bonin and Kuno Wagner, Leverkusen, Germany, assignors to Farbenfabriken Bayer Aktiengesellschaft, Leverkusen, Germany, a German corporation
No Drawing. Filed May 14, 1963, Ser. No. 280,435
Claims priority, application Germany, May 23, 1962, F 36,880
4 Claims. (Cl. 260—874)

The present invention relates to specific polycondensate modified polymers for preparing such products.

It is known to combine polycondensates with polymers in order to produce modified products which incorporate the advantages of both components. It is generally possible, by having a graduated variation of the proportions of the components used in the combination, to convert the properties of the polycondensate used gradually into the range of the properties of the polymer, and vice versa.

Such a combination of polycondensates with polymers can be obtained by dissolving one component in the other, and in addition to the purely physical dissolving process, it is also possible for chemically reciprocal actions of secondary valency character to occur between corresponding groups of the polycondensates and those of the polymer. However, it is very frequently found in this connection (for example, when using a liquid polyester as plasticiser for a polymer) that the chemical linkages between the polymer molecules and the polycondensate molecules are so slight that the components are readily separable under the action of a selectively acting solvent, i.e., one component is left after treating with the solvent and thus the properties of only the one component are again produced.

It has already been proposed to obviate these disadvantages by providing at least one, or beter still both, components with reactive groups which enable the formation of covalent bonds or linkages between the polycondensate molecules and polymer molecules. For example, the polycondensate component can be provided with polymerisable double bonds and then be subjected, together with a polymerizable vinyl compound, to the copolymerization. It is possible in this way to incorporate the actual polycondensate molecule into the polymer molecule and to exclude the aforementioned disadvantages of a physical mixture. Nevertheless, normally only cross-linked materials are obtained in this way, since it is very difficult in practice to introduce only one reactive group, e.g. a polymerizable double bond, per polycondensate molecule. However, in many cases it is actually desirable to obtain products of this type which are not cross-linked.

A process has now been found by which a polycondensate containing no functional groups which can cause cross-linking reactions can be covalently linked with a polymer component. This process makes it possible to produce modified polymers, in which the character of the final product can be continuously modified between a polymer character and a polycondensate character.

According to the process of this invention, the polymerization of a vinyl ester containing 2 to 4 carbon atoms in the esterifying acid is grafted on a polyacetal, which contains in its molecule at least two segments, which are due to the incorporation of an alkylene respectively polyalkylene oxide with a degree of polymerization of 1 to 3 and which has a molecular weight of at least 200. Such polyacetals are more especially compounds of the following general formula:

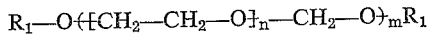

In this formula $R_1$ can represent a hydrogen atom, an alkyl radical, advantageously an aliphatic saturated hydrocarbon radical having 1 to 4 carbon atoms or an acyl radical preferably containing 2 to 4 carbon atoms and being derived from an aliphatic saturated monocarboxylic acid, the indices represent: $n$ a whole number of 1 to 3 and $m$ a whole number of 8 up to advantageously about 20.

Preferably a vinyl ester containing 2 to 4 carbon atoms in the esterifying acid is grafted on a polyacetal, which has been obtained from formaldehyde and diethylene glycol or triethylene glycol and has a molecular weight between 500 and 5000. The grafting of the vinyl ester, i.e. polymerization in the presence of the said polyacetal, is advantageously effected in the absence of solvents, and 3 to 95%, advantageously 30 to 70%, of vinyl ester, calculated on the total reaction mixture, are introduced.

It was particularly surprising that the essential segment of the polymer molecule given above, i.e. the grouping $\{CH_2-CH_2-O\}_n$ derived from the ethylene oxide and combined in the said polymer molecule, renders possible a very high degree of grafting of the polymer, whereas a single molecule corresponding to this segment, i.e., a monoethylene, diethylene or triethylene glycol, permits either none at all or only a very slight degree of grafting.

The high degrees of grafting between the initial polyacetal and the polymerising vinyl monomer were all the less expected, as the polyacetals no longer have to show any polyalkylene oxide character, for example no typical crystallinity, water solubility and substantial chemical resistance. For example, diethylene glycol is extremely unsuitable as a grafting base, because very large quantities of homopolymer are always still formed even when copolymerising this compound with a vinyl monomer, such as vinyl acetate. When using formaldehyde-diethylene glycol-polyacetal, for example of a molecular weight of 1800 as grafting base, it is possible on the contrary to produce an almost 100% graft yield.

Even more characteristic is the discovery that with the polymerization of for example vinyl acetate in diethylene glycol, generally no water-soluble polymers or polymers which can be cross-linked with polyisocyanates are obtained, whereas if vinyl acetate is polymerized in a formaldehyde-diethylene glycol-polyacetal with for example a molecular weight of about 110 and an OH number of 86, it is possible to obtain a polymer which is water-soluble and can be cross-linked by polyisocyanates to give films which are resistant to solvents.

The polyacetals to be used as grafting base for the process according to the invention are homogeneously miscible with the vinyl monomer to be grafted on and can have a linear structure, as, for example, in the case when using the polyethylene oxide segment. In principle, however, it is also possible to use polyacetals with a branched structure, for example those obtained by partial replacement of the polyethylene oxide segments with segments which are derived from polyfunctional alcohols. The molecular weight of the polyacetals to be used should be at least 200 but advantageously in the range between 900 and 9000.

The polyacetal is preferably produced from formaldehyde, although it is also possible—in specific cases—to employ polyacetals which are built up from formaldehyde in admixture with other acetal formers, such as acetaldehyde, butyraldehyde or with these by themselves. The alcohol component of the polyacetal to be used as grafting base is ethylene glycol itself or in admixture with other polyfunctional alcohols, such as the ethylene glycols which are obtained by hydrolisis or (mixed) oligomerization of ethylene oxide to degrees of polymerization of three. Ethylene glycol, diethylene glycol and triethylene glycol are preferably used. Other diols which may be employed in admixture with the oligomerization products indicated above (corresponding to a partial replacement of the polyethylene oxide segments, as previously set forth) are all diols usually employed for the production of polyacetals, such as for example propylene glycol, butanediol, pentane or hexane diols, cyclohexane diols, for the formation of the polyacetal. Addition products of 1 to 10 mols of ethylene oxide or propylene oxide to ethylene glycol, butylene-1,4-glycol, hexanediol, hexanetriol, trimethylolpropane, glycerine, etc., are also suitable.

The polyacetals which are used for the present process can be prepared by methods known per se, as for example by conversion of the corresponding aldehydes with diols or higher polyols in the presence of catalytic quantities of acids, and removing the water-forming in the reaction by re-acetalization (see Am. Soc. 57, page 925) or by condensation (see French Patent No. 892,447, I. G. Farben).

Monomers which can be used as grafting components for the present process advantageously are aliphatic or aromatic monovinyl compounds which can be subjected to radical polymerization, and the following are mentioned as examples: esters of vinyl alcohol with aliphatic saturated monocarboxylic acids, more especially those with an aliphatic saturated monocarboxylic acid having 2 to 4 carbon atoms, such as vinyl acetate, vinyl propionate, vinyl butyrate, vinyl chloracetate.

Vinyl esters, such as vinyl acetate or vinyl chloride, are of preferred significance within the scope of the present invention. It is additionally also possible to introduce polymerizable polyvinyl or polyallyl compounds, such as divinyl benzene, trivinyl benzene or glycol dimethacrylate, triallyl cyanurate, triallyl phosphate, either exclusively as polymerizable vinyl compound or in addition to the monovinyl compounds referred to above, this depending on the required degree of cross-linking. It is obviously possible to use mixtures of the aforementioned vinyl compounds with one another, and also to use these in combination with other copolymerizable compounds, for example maleic acid anhydride, maleic acid esters or fumaric acid esters.

The polymerization and grafting of the vinyl compounds on to the polyacetals can be effected by methods which are known per se, such as in block, in solution or in emulsion.

Depending on the reaction mixture and upon the required character of the final product, between 3 and 95% of the vinyl compound (calculated on the complete mixture) can be used. Proportions of vinyl compounds which are in the region of the lower limit are employed when it is desired to increase the viscosity of the polyacetal, whereas conversely high proportions of vinyl compounds are used when it is desired to soften a vinyl polymer with chemically incorporated acetal. Proportions of vinyl monomers which are between 30 and 70% (calculated on the total mixture), are of preferred interest within the scope of the present invention, which serves more especially for the production of highly viscous polyacetal graft polymers.

When carrying out solution polymerization, it is expedient to work in the presence of an inert solvent, i.e., one not influencing the polymerization, and the following are mentioned as examples of such solvents: aromatic hydrocarbons, such as benzene or toluene, aliphatic monohydric alcohols or aliphatic esters, such as methanol, ethanol, tert.-butanol, methyl acetate, ethyl acetate, etc.

In the case of solution polymerization, monomer-soluble radical formers are advantageously used, for example acyl peroxides (such as benzoyl peroxide or lauroyl peroxide) alkyl hydroperoxides (such as tert.-butyl hydroperoxide), cumene hydroperoxide, p-menthane hydroperoxide, dialkyl peroxides (such as ditert.-butyl hydroxyperoxide), or also ketone peroxides (such as cyclohexanoneperoxide). Furthermore, it is also possible to use organic nitrogen compounds which can lead to radical decomposition, for example, azodiisobutyric acid dinitrile. These types of initiators are employed in quantities between 0.1 and 5%, based on the total mixture.

The process according to the invention may moreover be carried out as an emulsion polymerization, in which case the vinyl monomer, together with the polyacetal to be used as grafting substratum, are emulsified in water, using conventional emulsifiers, and then polymerised in a manner usual for emulsion polymerization processes. The emulsifiers in this connection, can be of anionic, cationic or non-ionic character. Advantageously, long-chain paraffin sulphonates and fatty acid salts are used.

In the case of emulsion polymerization, water-soluble polymerization initiators or initiator systems, are preferably employed, for example, alkali metal persulphates in combination with reducing agents, such as alkali metal pyrosulphites, bisulphites, thiosulphates or formaldehyde sulphoxylate. Both the aforesaid water-soluble polymerization catalysts and the monomer-soluble catalysts, as indicated above, are normally used in quantities between 0.1 and 5%, calculated on the quantity of monomer.

The products of the process can for example be a polymer internally plasticised with the polyacetal or a polyacetal which has been changed by the polymer fraction in its properties of, for example, viscosity, solubility, inflammability, strength, crystallinity or its surface-active behaviour. Generally speaking, the properties of the products of the process can be continuously changed from polyacetal character to polymer character.

By means of the present process, it is also possible for reactive terminal or side groups of the polyacetal, for example OH groups or carboxyl groups or $$-NH-CH_2-OH$$

terminal groups, to be introduced into the polymer, and this can be of value for the said products for further reactions.

Since the products of the process can be further modified by hydrolysis reactions or further reactions with for example isocyanates or melamine-methylol compounds, they can be satisfactorily adapted to various special requirements.

The products provided by the present process can be used in the form of latices, solutions or as solid substances. They can serve directly as coating materials for lacquers, adhesives or as textile auxiliaries for increasing the crease resistance or as auxiliaries in the leather industry. It is additionally possible to use these products as components of foam materials as well as for the production of injection moulding compositions, casting resins and cements and for the production of foils, fibres and shaped elements.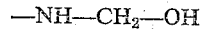

The parts given in the following examples are parts by weight, unless otherwise indicated.

*Example 1*

(a) *Comparison experiment.*—100 parts of vinyl acetate, 100 parts of diethylene glycol and 0.5 part of benzoyl peroxide are homogeneously dissolved in a sealed tube and polymerized for 24 hours at 80° C. The finally polymerized clear mass is thoroughly washed with water in order to remove the diethylene glycol and dried. A clear thermoplastic composition is obtained as a water-insoluble polymer fraction, which does not differ from a polyvinyl acetate of low molecular weight (acid number 0.9; 0.1% OH). For determining the possible graft polymer fraction, 2 parts of the dry polymer are dissolved in ethyl acetate, stirred with 2 parts of the 30% solution of triphenylmethane triisocyanate in methylene chloride and cast to a film, which is cross-linked for 2 hours at 100° C. A subsequent treatment with methanol was only able to dissolve homopolymer not carrying OH groups out of the cross-linked film. However, it is found that the entire polymer film is dissolved to a sludge in methanol and is thus destroyed.

(b) *Example.*—1500 parts of vinyl acetate, 5 parts of benzoyl peroxide and 1500 parts of a formaldehyde-diethylene glycol polyacetal, which has a molecular weight of about 1400 and an OH number of 88, are polymerized while stirring in an autoclave for 5 hours at 50° C. and then for 20 hours at 80° C. The polymer which is formed is released while hot and, on cooling, produces a highly viscous composition which is soluble in water with a slight degree of turbidity. 1.82 parts thereof are dissolved in 2 parts of ethyl acetate and stirred with 1 part of the triisocyanate solution as used above and then cast to form a film. The film is likewise cross-linked for 2 hours at 100° C. A piece of this film is extracted with methanol. The film merely swells and suffers a loss in weight of 11%.

This experiment is carried out in the same way with a polymer obtained from 1500 parts of vinyl acetate, 3 parts of benzoyl peroxide and 500 parts of the polyacetal, the cross-linked film experiencing a loss in weight of 21% in extraction.

It is clear from the water solubility and the extraction experiments that the major proportion of the vinyl acetate introduced has been grafted on to the initially supplied polyacetal, whereas upon initially providing diethylene glycol, no or only very few OH groups or diethylene glycol are incorporated into the polymerisation product, which thus exists substantially as a homopolymer.

*Example 2*

50 parts of linear polyacetal comprising formaldehyde and triethylene glycol (OH number 90) and 50 parts of vinyl acetate are heated with 1 part of benzoyl peroxide as a homogeneous solution in a sealed tube to 80° C. After 12 hours, a highly viscous mass has formed, which is completely dissolved in water with very slight clouding.

If for comparison purposes triethylene glycol is used instead of the polyacetal, it is found that the polymer composition which has formed cannot be dissolved in water.

In the foregoing example, it is possible for vinyl propionate or vinyl butyrate to be used instead of the vinyl acetate, with equal success.

*Example 3*

50 parts of the polyacetal used in Example 2 are kept with 50 parts of ethyl acrylate and 1 part of dicumyl peroxide in a sealed tube as a homogeneous solution for 12 hours at 120° C. The polymer mass is thoroughly washed with water. The fraction which is insoluble in water constitutes a tacky substance, which is suitable as reversely acting emulsifier. 10 parts thereof are for example dissolved in 100 parts of styrene. Using a stirrer mechanism, 400 parts of water are gently stirred into this solution to form a reversed emulsion. Contrasting with the above discovery, the use of ethyl acrylate block polymer produced in the usual manner only leads to unstable foams having large pores, which cannot be considered as a reversed emulsion.

*Example 4*

The following components are kept as a homogeneous mixture in a sealed tube for 10 hours at 80° C.: 1 part of benzoyl peroxide, 49 parts of vinyl acetate, 50 parts of a polyacetal of formaldehyde and triethylene glycol, which contains about 26 parts of incorporated

groupings and has been produced with the use of dimethylol urea as diol (NH plus OH numbers: 200). The highly viscous mass which forms is readily soluble in water, with formation of a milky cloudiness.

What is claimed is:

1. A process for the preparation of polycondensate-modified polymers which comprises polymerizing by means of a peroxide polymerization catalyst (a) a vinyl-ester containing in its ester group 2–4 carbon atoms with (b) a polyacetal having a molecular weight of at least 200 and corresponding to the formula

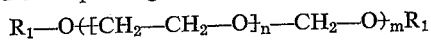

wherein $R_1$ represents a member selected from the group consisting of hydrogen, an alkyl group having 1–4 carbon atoms and an acyl group containing 2–4 carbon atoms and being derived from an aliphatic saturated monocarboxylic acid, wherein $n$ indicates a whole number of 1 to 3 and $m$ a whole number of 8 to 20, said vinylester (a) being present in an amount of between 3 and 95 percent by weight, calculated on the sum of the components (a) and (b), said polyacetal being obtained by condensing aldehyde with a member selected from the group consisting of diols and triols.

2. The process of claim 1 wherein said polyacetal is obtained by condensing formaldehyde with ethylene glycol.

3. A product as obtained by the process of claim 1.

4. A product as obtained by the process of claim 2.

No references cited.

MURRAY TILLMAN, *Primary Examiner.*

J. T. GOOLKASIAN, *Assistant Examiner.*